April 29, 1924. Re. 15,828

C. G. STRANDLUND

WHEELED PLOW

Original Filed May 20, 1918 4 Sheets-Sheet 1

April 29, 1924.

C. G. STRANDLUND

Re. 15,828

WHEELED PLOW

Original Filed May 20, 1918 4 Sheets-Sheet 2

April 29, 1924.

C. G. STRANDLUND

Re. 15,828

WHEELED PLOW

Original Filed May 20, 1918 4 Sheets-Sheet 3

Witness;
E. Wilderson

Inventor;
Carl G. Strandlund
Adams & Jackson.
Attorneys

April 29, 1924.

C. G. STRANDLUND

Re. 15,828

WHEELED PLOW

Original Filed May 20, 1918 4 Sheets-Sheet 4

Witness;
E. Wilderson

Inventor;
Carl G. Strandlund,
By Adams & Jackson
Attorneys.

Reissued Apr. 29, 1924. Re. 15,828

UNITED STATES PATENT OFFICE.

CARL G. STRANDLUND, OF MOLINE, ILLINOIS, ASSIGNOR TO DEERE & COMPANY, OF MOLINE, ILLINOIS, A CORPORATION OF ILLINOIS.

WHEELED PLOW.

Original No. 1,463,379, dated July 31, 1923, Serial No. 235,565, filed May 20, 1918. Application for reissue filed March 21, 1924. Serial No. 700,975.

*To all whom it may concern:*

Be it known that I, CARL G. STRANDLUND, a citizen of the United States, residing at Moline, in the county of Rock Island and State of Illinois, have invented certain new and useful Improvements in Wheeled Plows, of which the following is a specification, reference being had therein to the accompanying drawing.

My invention relates to wheeled plows in which one or more plow bodies are adjustably supported on wheels and capable of being raised or lowered for various depths of plowing, or raised entirely out of operation for transportation or other purposes.

The object of my invention is to provide a simple and effective mechanism by which the plow bodies can be automatically raised or lowered combined with manually operable mechanism for regulating the plowing depth and leveling the plow, as will be fully disclosed in the following specification.

Referring to the drawings in which similar letters indicate identical parts—

Figure 8 is an enlarged detail plan of one of the operating lever connections; and Figure 9 is an enlarged sectional detail of a part of the clutch mechanism.

Figure 1:
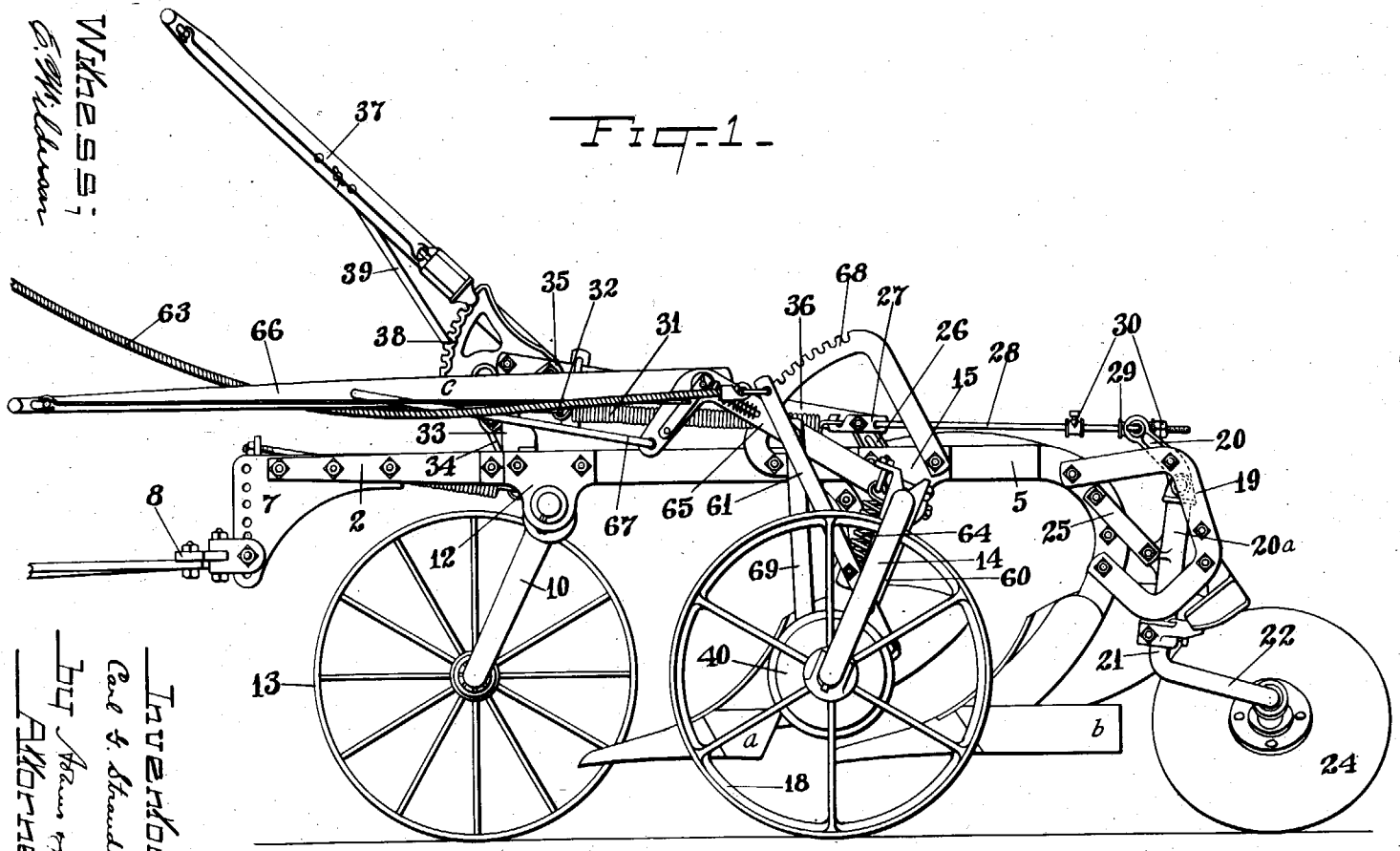
Figure 1 is a side elevation of the wheeled plow embodying my invention and showing the plow bodies raised from the ground.
Figure 2:
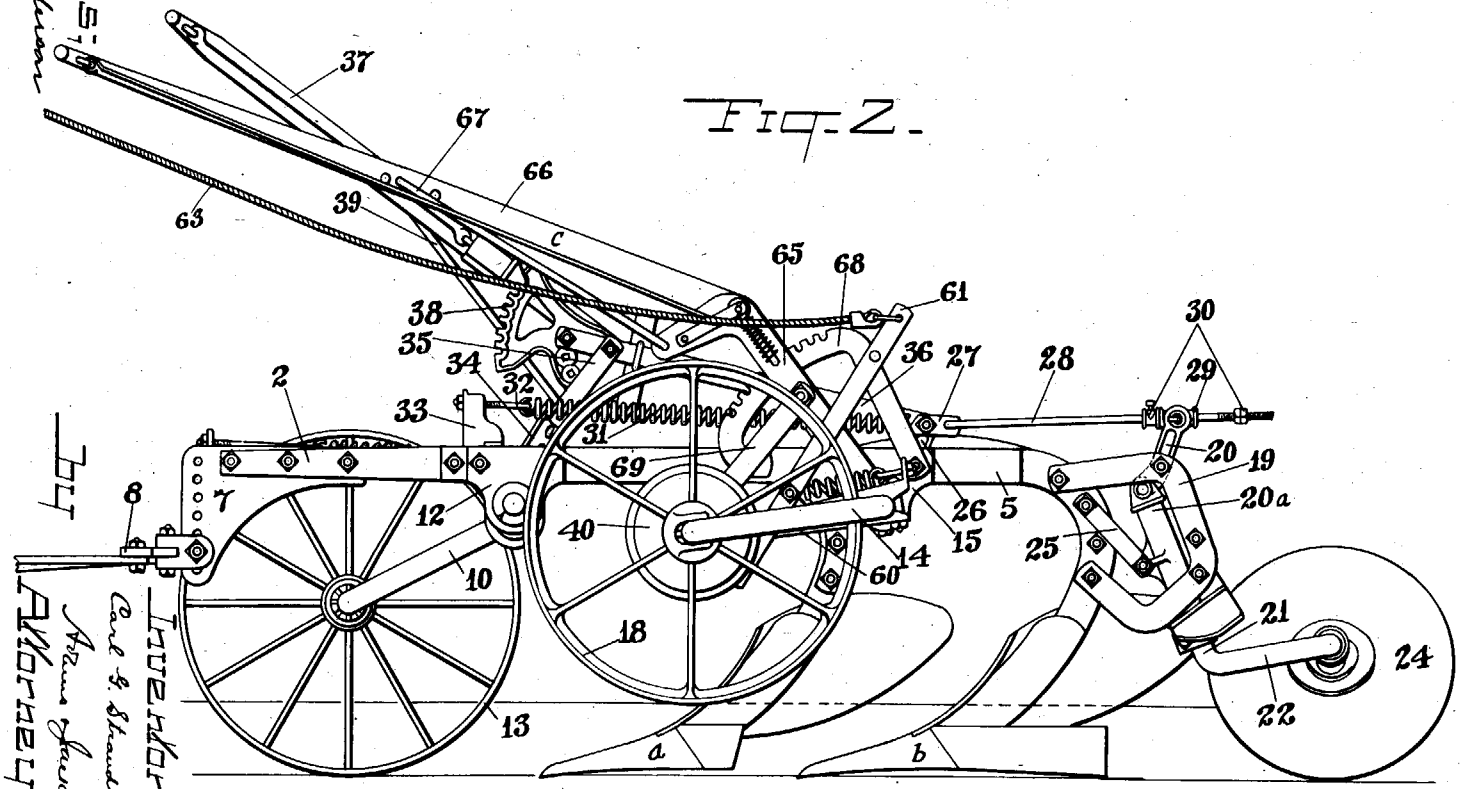
Figure 2 is a similar view with the plow bodies lowered and in plowing position.
Figure 3:
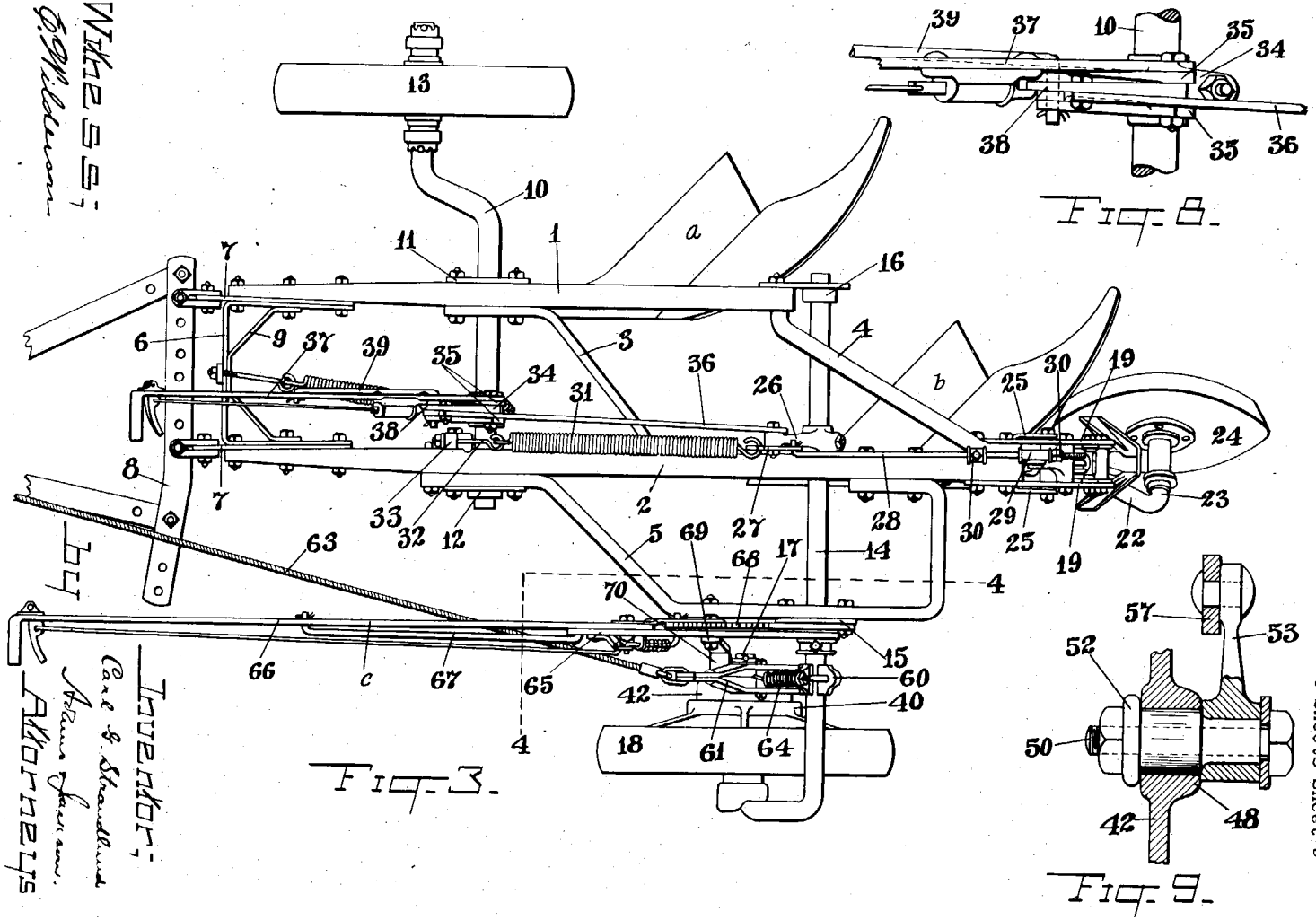
Figure 3 is a plan view.

The frame of the plow comprises the plow beams 1 and 2 spaced apart and rigidly connected by braces 3 and 4 bolted thereto, and a bar 5 bent preferably as shown and rigidly bolted to the beam 2. Plow bodies *a* and *b*, constituting a plowing unit of a well known type, are carried by the beams 1 and 2. Between its ends the bar 5 is spaced apart from the beam 2 and forms a support on which is journaled the land wheel axle and to which are secured parts of the lever mechanism for adjusting the land wheel as will be hereinafter described. The forward ends of the beams 1 and 2 are connected by a U-shaped member 6 between the arms of which and the beams 1 and 2 are secured clevises 7, to which is connected a draft bar 8, the same bolts securing the U-shaped member 6 and the clevises 7 to the beams 1 and 2. To stiffen the construction at this point I provide a brace 9 which is bolted to the centre of the U-shaped member 6 and to the beams 1 and 2.

A crank axle 10 is rockably journaled in bearings 11 and 12 secured to the beams 1 and 2 respectively, and extends forwardly and downwardly, and on the outer end thereof is mounted a furrow wheel 13. An axle 14 is rockably journaled in a bearing 15 on the bar 5 and extends across the plow, between the front and rear planes of the plowing unit, to a bracket 16 on the beam 1 in which the furrowward end is supported. The landward portion of the axle 14 is bent downwardly, and forwardly, and terminates in an inwardly extending spindle 17 on which is supported a land wheel 18. Within the hub of the latter is contained the clutch mechanism by operation of which the traction power of the land wheel is utilized at will to raise the plow as will be stated.

Mounted on opposite sides of the rear of the beam 2 are frame members 19. A lever 20 is pivotally supported intermediate its ends between the frame members 19, its lower end being pivoted to the bifurcated upper end of a sleeve $20^a$, in which is journaled a spindle 21, preferably integral with a crank axle 22 on the laterally extending portion 23 of which is mounted a rear furrow wheel 24. The sleeve $20^a$ is pivotally connected, intermediate its length, to swinging links 25 pivoted on opposite sides of the beam 2.

Rigidly mounted on the axle 14 is an upstanding arm 26, and pivotally supported intermediate its length thereon is a member 27 to the rear end of which a rod 28 is hooked; the rod 28 extends rearwardly to slide through a sleeve 29 which is pivotally connected to the upper end of the lever 20. Adjustable stops 30 on the rod 28, on opposite sides of the sleeve 29, limit the sliding movement of the rod 28. A coil spring 31 is connected to the forward end of the member 27 and extends to connection with an eye bolt 32 which is secured on a bracket 33 bolted to the beam 2. An upstanding arm 34 is rigidly mounted on the axle 10 and to the upper end thereof I pivotally secure a link 35, the upper end of which is pivotally bolted to a bar 36 extending rearwardly and pivotally secured to the arm 26. On the side of the bar 36, opposite the link 35, is pivotally mounted a lever 37, the bolt which secures the link 35 and the bar 36 together, serving as said lever's pivot. The lever 37 is provided with the usual type of latch to engage with notches in a segmental rack 38 rigidly bolted to the forward end of the bar 36. A rod 39 is connected to the lever 37 intermediate the length of the latter and extends to a pivotal connection with the arm 34.

Normally the land wheel 18 revolves freely upon the spindle 17, when the plow is at work as well as when it is raised from the ground, but when I desire to raise the plow by the traction power of the land wheel 18 I employ a clutch mechanism to connect the land wheel 18 with certain parts attached to the plow. The clutch I employ is contained in a casing part of which, 40, is preferably integral with the wheel hub 41. The second part, 42, of the casing is rotatably mounted on the axle portion 17 and fits within an annular enlargement of the part 40. The hub 41 is provided with bushings 43 through which the axle portion 17 extends. Both ends of the axle portion 17 have sand caps 44 and 45, the former adapted to fit over the outer end of the hub 46 of the casing part 42 and being held thereon by a pin or cotter 47 which also serves to retain the casing part 42 in place.

On the inner face of the casing part 42, and diametrically opposite the center thereof, are bosses 48 and 49 through which extend loosely bolts 50 and 51. Dogs 52 are rigidly mounted on the outer ends of the bolts 50 and 51 and project outwardly toward the periphery of the casing part 40. A lever 53 is rigidly mounted on the inner end of the bolt 50; a lever 54 is rigidly secured, intermediate its ends, on the inner end of the bolt 51, and has its lower termination formed into a hook 55 to engage with a coiled spring 56 the other end of which is secured to the casing part 42. A link 57 connects the upper termination of the lever 54 with the lever 53, and at the connection between said link and the lever 54 I mount a roller 58 which is adapted to engage with notches 59 in the inner circumference of the casing part 40.

Figure 6:
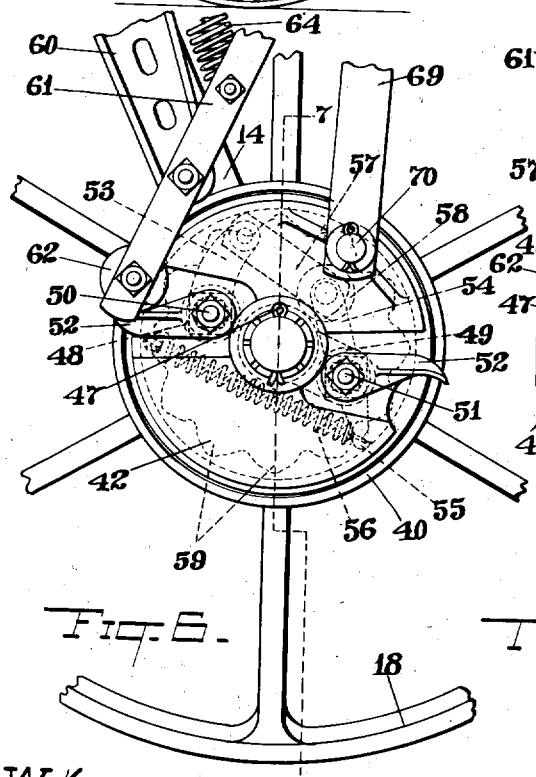
Figure 6 is an enlarged detail of the land wheel hub showing in dotted lines the parts of the clutch mechanism contained therein.

On the axle 14, and extending toward the land wheel axis, is rigidly secured an arm 60 to the lower end of which is pivotally secured a tripping lever 61 formed preferably of two flat bars spaced apart by the arm 60 which is pivoted between them. The tripping lever 61 extends below its pivotal connection with the arm 60 and between its lower ends is mounted a roller 62 which is adapted to engage with one of the dogs 52, which present a curved surface for that purpose, and to retain the roller in contact therewith until removed therefrom by operation of the tripping lever 61. When one of the dogs 52 is actuated by the roller 62, as shown in Figure 6, the roller 58 is moved out of engagement with the notches 59 in the fixed clutch member or casing part 40, thereby releasing the casing part 42 therefrom and permitting the land wheel to rotate independently of said casing part 42. It will be seen, therefore, that the tripper comprising the tripping lever 61 and the roller 62 constitutes a holder by which the loose member or casing part 42 of the clutch is normally held against rotation, and that said casing part 42 constitutes an intermittingly rotating power transmitting device which may be optionally rotated unidirectionally by the land wheel by actuating the tripper to release the dog 52 with which the roller 62 may be in engagement, and thereby permit the clutch members to be interlocked. The upper portion of the bars forming the tripping lever 61 converge and are rigidly secured together and to the end thereof is connected a cable 63 leading to the tractor by which the plow is drawn. Above the pivotal connection of the arm 60 with the tripping lever 61 I secure to the latter a coiled spring 64 the other end of which is attached to the upper portion of the arm 60.

Loosely supported on the axle 14 is a hand lever *c* formed preferably of two parts 65 and 66, the former being bent forwardly and downwardly from its connection with the part 66, and to the forward end thereof I connect a rod or brace 67 which is also connected to the part 66 intermediate the ends of the latter. A segmental rack 68 is secured on the main frame, with the notches of which a well known type of latch on the lever is adapted to engage.

A link 69 is pivotally connected to the lever *c*, intermediate the ends of the part 65, and it extends downwardly to a stud 70 on the casing part 42, the stud being adjacent the periphery of the casing part 42, and substantially equidistant from the dogs 52, and it projects a sufficient distance to permit the link 69 to swing clear when the casing part 42 turns with the wheel in raising the plow.

Figure 4:
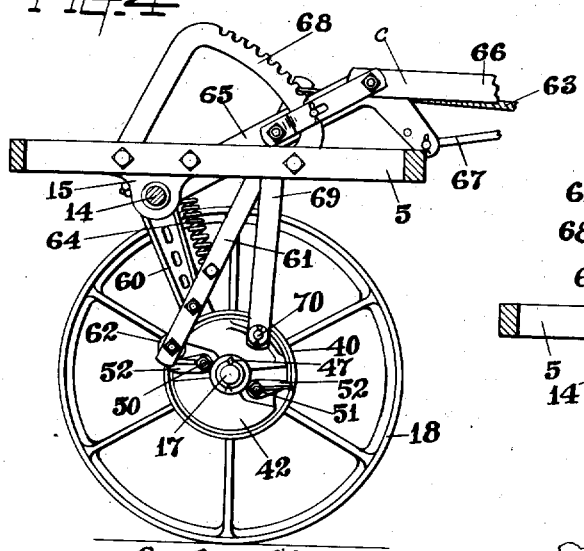
Figure 4 is a section on the line 4—4 of Figure 3 looking from the center of the plow toward the land wheel and showing the latter and connected parts in the position assumed when the plow is raised.
Figure 7:
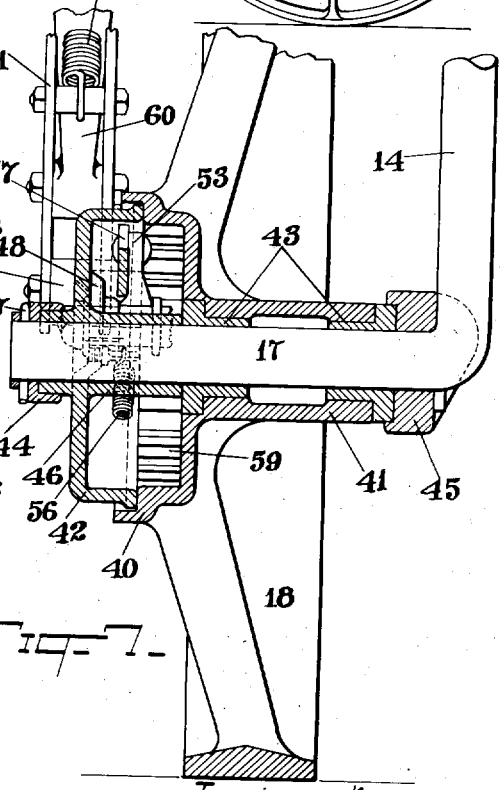
Figure 7 is an enlarged detail section on the line 7—7 of Figure 6.

As it is shown in Figure 1 the plow is raised from the ground, the clutch and connected parts being in the position illustrated therein and in Figures 4, 6, and 7. To lower the plow I pull the cable 63, rocking the tripping lever 61 on its pivot on the arm 60, until the roller 62 is released from the dog 52 with which it is engaged. It then follows, by reason of the tension of the coiled spring 56, that the levers 53 and 54 are rocked to move the roller 58 into engagement with one of the notches 59 in the casing part 40. When the roller 62 is disengaged from the dog on which it has been resting when the plow is raised, the casing part 42 is rotated by the weight of the plow, through the link 69, and the plow is lowered, the axle 14 being rocked to move the land wheel forwardly. When the axle 14 is rocked in lowering the plow the arm 26 is rocked rearwardly, and as the latter is connected to the lever 20 by the rod 28, the sleeve 20[a], in which the spindle 21, carrying the rear furrow wheel 24 is journaled, is permitted to swing on the link 25 to lower the rear end of the plow; at the same time the axle 10 is rocked and the furrow wheel 13 thereon is moved forwardly by the bar 36, which is connected to the arm 26 and to the arm 34 on the axle 10. It is thus apparent that the land wheel and both furrow wheels are actuated simultaneously to lower the plow. By the tension of the spring 64 the lower end of the lever 61, on which is mounted the roller 62, is always in position for the roller to engage with one of the dogs 52; consequently when the plow is down, the revolution of the land wheel and the clutch casing brings the next dog 52 into engagement with the roller 62, thereby rocking the levers 53 and 54 to disengage the roller 58 from the notch 59 in which it has been resting.

Figure 5:
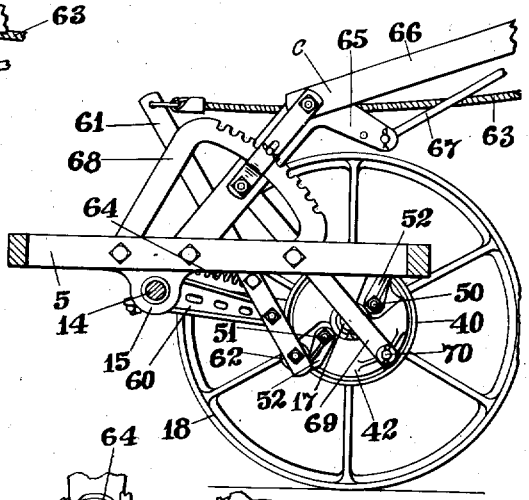
Figure 5 is a similar view showing the land wheel and connected parts in the position assumed when the plow is lowered to operative position.

To raise the plow I again pull the cable 63 and rock the tripping lever 61 until the roller 62 is disengaged from the dog 52 with which it is in contact, as shown in Figure 5, whereupon, as previously explained, the roller 58 enters one of the notches in the casing part 40, locking the casing parts together so that they move as one with the land wheel 18. The traction power of the land wheel 18 is now utilized, through the link 69, to raise the plow, the link 69 being connected to the casing part 42 and to the hand lever *c* which is firmly held by its ratchet engagement with the segment rack 68. The rotation of the land wheel with the clutch parts engaged continues until the lower end of the link 69 has been carried by the vertical axis of the land wheel, at which time the following dog is in contact with the roller 62; the weight of the plow acting on the link 69, after the pivotal connection of the latter has passed the vertical plane of the axis of the land wheel, is now exerted to force the dog 52 against the roller 62 which results in the roller 58 being withdrawn from engagement with the notch 59, in which it has been held while the plow is being raised. While the land wheel 18 is now free to travel without its traction power being employed, the plow is held in its raised position by the tripping lever 61, the arm 60, and the link 69, which together keep the casing part 42 from rotating about its axis. By actuating the hand lever *c* from the position shown in Figure 4 to the limit of its downward play, the plow can be raised somewhat higher, the lever *c* fulcruming at its pivotal connection with the link 69.

The land wheel 18 is independently adjustable to regulate the depth of plowing by actuation of the hand lever *c*, for as the axle 14 is rocked and the land wheel raised the arm 26 is also rocked, and in a rearward direction, but the connection of the arm 26 to the rocking lever 20 is by the rod 28 which is slidably mounted in the sleeve 29, connected to the rocking lever 20, and slides freely therein, its limit of play being regulated by adjustment of the stops 30. In raising the plow the rear stop 30 contacts with the sleeve 29 at the desired moment and the rear furrow wheel is moved forwardly by swinging the sleeve 20[a] to which the rocking lever 20 is connected.

The position of the furrow wheel 13 is changed when the hand lever *c* is actuated to regulate the depth of plowing, but the furrow wheel 13 is independently adjustable to level the plow, irrespective of the positions of the rear furrow wheel 24 and the land wheel 18, by actuation of the hand lever 37. When the latch of the hand lever 37 is engaged with the rack 38 the parts connecting the lever 37 with the arm 34 are in rigid relation one with the other, but when the latch is released actuation of the lever 37 will rock the arm 34, by reason of the rod 39 connecting the lever 37 with the arm 34.

The axle 14, as previously described, has the spindle portion 17, on which the land wheel 18 is mounted, bent substantially parallel to the main portion of the axle, by which construction I am enabled to bring the land wheel and the lever mechanism connected therewith in close relation to the main frame of the plow, presenting in a simple, compact form the elements utilized in raising and lowering the plow. By locating the supporting wheels as shown the weight of the plow is more readily carried and the operation of raising and lowering it is consequently effected with greater efficiency.

Arm 60, which supports the clutch tripper, is supplemental to the bail element of the land wheel support, and is independently secured to its journal element, the bail element being on the landward side of the wheel while the tripper-carrying arm 60 is positioned on the furrowward side. When the frame and plow bodies are in either their uppermost or their lowermost position the two clutch elements can be locked together by actuating the tripper, comprising the parts 61, 62, and inasmuch as the arm 60 can, as concerns the clutch, be regarded as an abutment carried by the frame, the driven clutch element is normally locked relatively to the latter. Consequently there is a firmly connected train of parts extending from the spindle to the frame, through the journal part of the axle, this train of parts being positioned in the vertical longitudinal planes of the clear space between the land wheel and the frame. Although the axes of the crank journal, of the pivot which joins arm 60 and lever 61, and of the roller 62 do not come fully to a straight line, the parts are held by the strong spring 64 in a position such that they assist very largely in sustaining the spindle 17 of the land wheel firmly in position, supplementing the action of the link 69 in this respect, the bail element holding the landward side of said spindle.

What I claim is—

1. In a wheeled plow of the class described the combination of the frame, the plurality of plow bodies carried thereby, the front furrow wheel, the axle holding said wheel in front of the plow bodies when at work, the rear furrow wheel, the lifting mechanism thereon for the rear end of the frame, the land wheel, the swinging crank axle therefor having a journal element on an axis at the rear end of the plow frame and also a bail element arranged to hold the land wheel in the transverse planes of the plow bodies and to push directly upward on the journal element when the axle swings, power transmitting devices connecting the two said axles and the rear lifter, and an axle-swinging power transmitter operated by the traction of the land wheel, said parts being arranged substantially as set forth, whereby power is transmitted from the land wheel to thrust upward directly against the rear end of the frame, and to simultaneously cause the front wheel to lift the front end thereof, and to cause, simultaneously with the rising of said front end, a variable lifting action on the rear wheel.

2. In a wheeled plow of the class described, the combination of the frame, a plurality of plow bodies carried thereby, the front furrow wheel, the axle holding said wheel near the front end of the frame during plowing operation, the rear furrow wheel, the lifting mechanism thereon for the rear end of the frame adapted to permit said rear end to rise and fall relatively to the rear wheel independently of the lifting mechanism, the land wheel, the swinging crank axle therefor having a journal element on an axis near the rear end of the plow frame and also a bail element arranged to hold the land wheel in transverse planes relatively remote from the planes of the front furrow wheel and in the transverse planes of the plow bodies, power transmitting devices connecting the two said axles and the rear lifter, and an axle swinging power transmitter operated by the traction of the land wheel, said parts being arranged substantially as set forth whereby the land wheel is adapted to directly lift the plow bodies relatively to the furrow wheels when in operation to follow an uneven ground surface, and also to transmit lifting power to the rear end of the frame for simultaneously causing the lifting of the plow bodies relatively to the three wheels.

3. The combination with the beam frame, the plow bodies, the front furrow wheel, and the land wheel, of the crank axle having a journal element on the frame, a spindle element for the land wheel and a bail element on the landward side of the latter wheel, said spindle element extending furrowward through the wheel, an intermittingly rotating power transmitting device on the axis of the land wheel, and optionally rotated unidirectionally thereby, the vertically arranged link pivotally connected to said intermittingly rotating transmitter and to said frame, the optionally actuated tripping device and holder adapted to prevent rotation of said transmitter, and the support for the tripping device supplemental to the said bail element and rigidly attached to the journal element and positioned on the furrow side of the land wheel.

4. The combination with the frame, the plow bodies, and the land wheel, of the wheel carrier comprising a journal element mounted on the frame, a bail element rigid with the journal element and positioned on the landward side of the wheel, the arm on the furrowward side of the wheel supplemental to the bail element and rigid with the journal element, the rotary power transmitting device at the axis of the wheel and driven thereby intermittingly and unidirectionally, the link connecting the said power transmitter to the frame to move vertically therewith, the tripper and holder mounted on said arm for normally preventing the transmitter from rotating and for releasing the same, said arm, tripper, and bail element being arranged to form a bracing support for the wheel spindle.

5. In a wheeled plow of the class described, the combination of a plowing unit composed of a plurality of plow beams and bodies rigidly secured together, a front furrow wheel, a rocking crank axle for said wheel journalled on the frame, a land wheel, a crank axle journalled on the frame and extending to the landward side of the land wheel and then downward to form a crank on said side and bent to form a spindle extending furrowward through the land wheel, a clutch having a continuously going element connected to the land wheel and an intermittingly rotated element on the furrow end of said spindle, and a link having its lower end pivoted to said intermittingly driven clutch element and permanently connected pivotally to the plow frame on the furrowward side of the land wheel, said link and said crank being arranged to sustain the frame directly on the land wheel and to brace both ends of the spindle.

6. In a wheeled plow of the class described, the combination of a plowing unit composed of one or more plow beams and bodies rigidly secured together to form a frame, a front furrow wheel, a crank axle for said wheel rockably journaled on the frame, a land wheel, a rockable axle journaled on the frame and extended to a point landward of the land wheel, and having a crank on the landward side of said wheel and being bent to form a spindle extending furrowward through the land wheel, a clutch having a rotary element rigid with the land wheel and a radially expanded intermittently driven clutch element landward of the frame and furrowward of said wheel, and a vertical link in a vertical plane between the innermost plow beam and the land wheel, said link being pivoted to, and having its lower end movable with, the intermittently driven part of the clutch, around the spindle axis, and adjustably connected at its upper end to the frame, said link and said crank bearing downward on the ends of the spindle on opposite sides of the wheel under the weight of the frame and the body.

CARL G. STRANDLUND.